Jan. 16, 1940.   R. W. DINZL   2,187,345
MATERIALS TESTING MACHINE
Filed Sept. 13, 1935
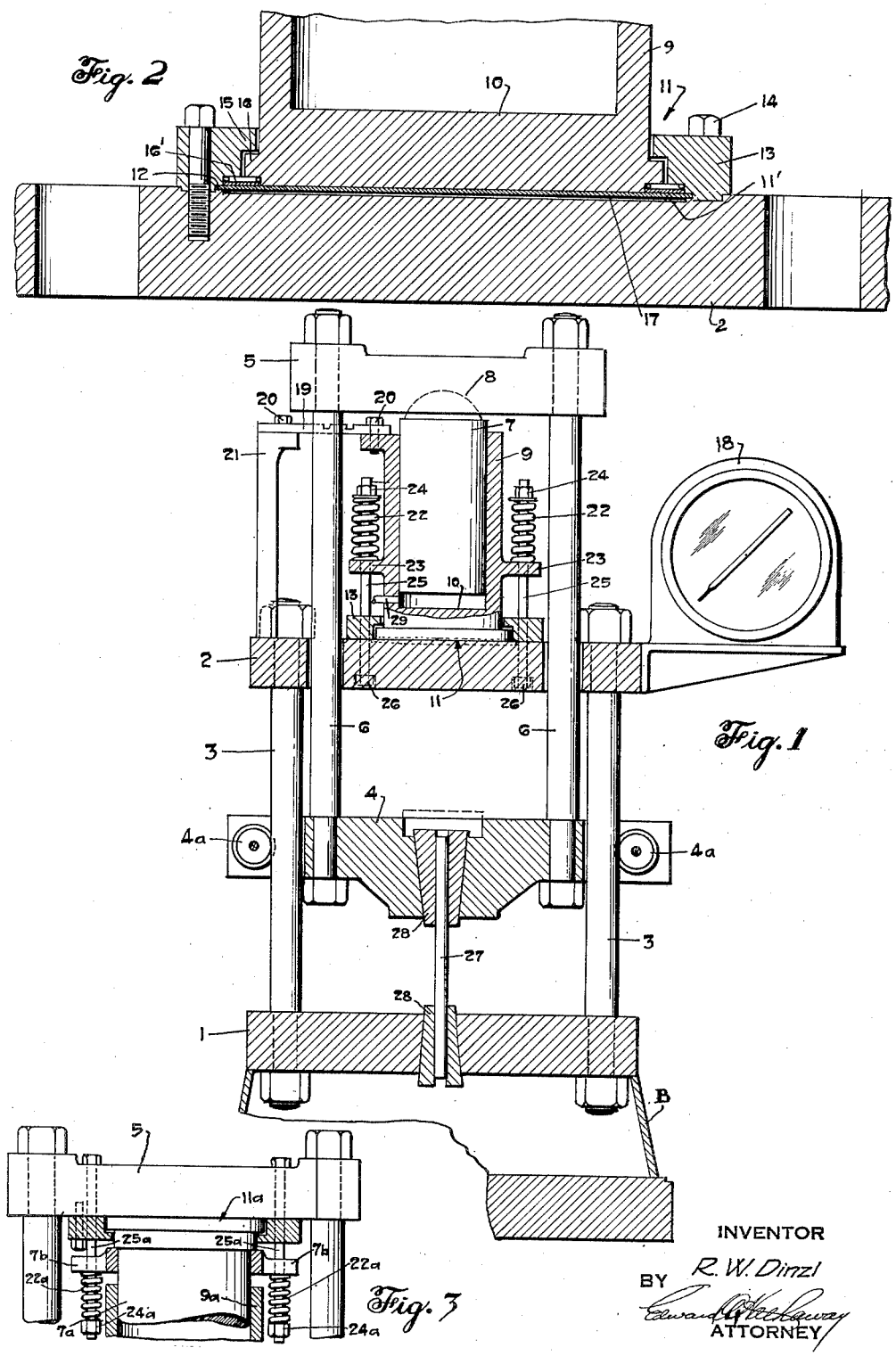
INVENTOR
R. W. Dinzl
BY
Edward [signature]
ATTORNEY Patented Jan. 16, 1940

2,187,345

UNITED STATES PATENT OFFICE 2,187,345

MATERIALS TESTING MACHINE

Richard W. Dinzl, Narberth, Pa., assignor to Baldwin-Southwark Corporation, a corporation of Delaware Application September 13, 1935, Serial No. 40,468

3 Claims. (Cl. 265—14)

This invention relates to hydraulic materials testing machines of the type employing an independent hydraulic weighing system, and it is an object of my invention to provide an improved combination of elements in such a machine whereby they are readily accessible for inspection and replacement in case of repair and are otherwise economical in manufacture, maintenance and operation without sacrifice of ease of operation of this general type of machine or its precision qualities.

In the specific embodiments of the invention as herein disclosed, I provide stationary and movable frames, preferably of rectangular or yoke form, one of which has upper and lower movable transverse crossheads connected by rods and the other having upper and lower transverse stationary platens also connected by rods, one of the movable crossheads being interposed between the platens whereby each end of the machine is provided with a stationary platen and an adjacent movable crosshead, and then between said adjacent movable and stationary frame members I place hydraulically actuated load producing ram and cylinder elements and interpose a hydraulic weighing support between one of said elements and the adjacent stationary platen or between one of said elements and the adjacent movable crosshead, together with initial load springs directly connecting the platen or crosshead to one of said elements for imposing an initial load on the hydraulic support. The foregoing relations are applicable to the specific structure shown when used either in its preferred or inverted position, or when with the machine inverted the two frames have their stationary and movable functions interchanged with a suitable base support therefor. The advantages of my improved relation are maintained under such conditions together with various other advantages and objects that will be more apparent to those skilled in the art from the following description of the accompanying drawing in which:

Fig. 1 is a vertical sectional view of a machine partially shown in diagrammatic outline for clarity;

Fig. 2 is an enlarged fragmentary vertical section of the hydraulic support and its relation to the upper platen;

Fig. 3 is a modified arrangement between the hydraulic support and crosshead.

In the particular embodiments of the invention which are shown herein merely for the purpose of illustrating certain specific forms among possible others that the invention might take, I have provided a stationary frame having lower and upper normally stationary platens 1 and 2 disposed in fixed relation to each other by a series of joining columns 3 and supported upon any suitable base B. A sensitive or movable frame has lower and upper crossheads 4 and 5 joined preferably by two tension rods 6. Rollers 4a or any other suitable guiding means may be supported by platen 4 for engagement with joining columns 3. If desired, crosshead 4 may be supported upon rods 6 by any usual adjustable nut and thread engagement whereby the elevation of crosshead 4 may be varied to suit specimens of different lengths. From the foregoing it is seen that one of the crossheads is disposed between, and the other crosshead outside of, the platens. There is thus formed a pair of cross members at each end of the machine, each pair having one of its members movable and the other of its members stationary.

Upper crosshead 5 is operatively connected to a ram or piston 7 preferably through a semi-spherical ball and socket joint 8, although other suitable universal means may be employed. Ram 7 is disposed within a cylinder 9 whose lower end forms the piston or backing wall 10, Fig. 2, of a hydraulic weighing support generally indicated at 11. The support per se is preferably of the type shown in Emery Patent No. 1,846,468, and its particular relation to the present improved arrangement will be better understood by briefly mentioning that the support 11 includes a disc diaphragm 11' whose peripheral edge is clamped between an annular flange 12 and a suitable cooperating recess in a clamping ring 13. This ring is secured to the top of platen 2 by a series of bolts 14 and has an annular flange 15 overlying a stop flange 16 of piston 10. A suitable annular ring 16' bridges the gap between piston 10 and ring 13 in such a manner as to adequately support the diaphragm across this gap. A weighing fluid recess or chamber 17 is formed in the top surface of platen 2 adjacent the diaphragm. A pipe connects said weighing chamber to a suitable load indicating mechanism generally indicated at 18, this mechanism preferably being a Bourdon tube gauge and dial supported by stationary platen 2. The ring 16' functions not only as a bridge ring but also as a stay plate to hold piston 10 against lateral movement during operation of the machine. The upper end of cylinder 9 is held against lateral displacement by a stay plate or plates 19 whose ends are secured by bolts 20 to a suitable lug on cylinder 9 and to a substantial bracket 21 which is rigidly secured to platen 2 as by being bolted thereto or cast integrally therewith. As a result of the stay plate 19 and the stay plate function of ring 16, it is seen that the axis of cylinder 9 and piston 10 will be positively maintained in a vertical position during its very small weighing movements notwithstanding heavy eccentric loading of a specimen.

To place an initial load on the hydraulic support and indicating mechanism 18, there is provided preferably a pair of initial load springs 22 located at diametral points. These springs are interposed between lugs 23 preferably cast integrally with cylinder 9 and nuts 24 of rods 25, these rods extending downwardly through suitable openings in platen 2 and if necessary through annular ring 13 to receive nuts 26 disposed in suitable recesses on the under side of platen 2. The initial load springs when placed under sufficient compression will force cylinder 9 and its piston 10 downwardly and thus impose an initial load on the weighing liquid in chamber 17.

In the operation of the machine, a specimen 27 is held by any suitable grips 28 during a tension test while in a compression test the specimen is disposed between crosshead 4 and platen 2. To stress the specimen, fluid pressure from any suitable source such as a hydraulic pump is supplied to cylinder 9 through a pipe connection 29, whereupon ram 7 moves upwardly to transmit load through tension rods 6 to crosshead 4 to the specimen. The load transmitted through rods 6 is the load actually imposed upon the specimen, the reaction to this load being through the hydraulic support 11. Hence the hydraulic pressure in the weighing fluid is directly proportional only to the specimen load regardless of any friction between the cylinder and ram or other points in the system.

In Fig. 3, cylinder 9a is immovably secured to the stationary platen corresponding to 2 while its ram 7a is operatively connected, through an interposed hydraulic support 11a, to crosshead 5. The upper end of the ram thus forms the diaphragm piston of the hydraulic support whereby an initial load is imposed thereon by springs 22a. These springs are interposed between suitable ram lugs 7b and nuts 24a of bolts 25a, these bolts passing through and being secured at the upper end to crosshead 5.

From the foregoing disclosure, it is seen that I have provided a hydraulic materials testing machine of the independent hydraulic weighing system type in which the parts are readily accessible due to the fact that the initial load springs by acting substantially directly on the diaphragm piston 10 permit crosshead 5 and ram 7 to be removed for inspection or repair without the necessity of releasing the initial load force which is of considerable magnitude. Also it is possible to preload the hydraulic support before the crosshead 5 and other associated elements are assembled as well as obtain other advantages incident to the structural and functional cooperation of the various elements and their arrangement.

It will of course be understood that various changes in details of construction and arrangement of parts may be made by those skilled in the art without departing from the spirit of the invention as set forth in the appended claims.

I claim:

1. A hydraulic materials testing machine for tension and compression testing comprising, in combination; a stationary rectangular frame having a pair of stationary cross members connected together; a movable rectangular frame having a pair of cross members connected together and one of which is disposed intermediate of said stationary cross members and the other of which is disposed outside thereof; hydraulic ram and cylinder elements disposed between, and respectively operatively connected to said outside movable cross member and the stationary member adjacent thereto; a hydraulic weighing support interposed between one end of one of said elements and the cross member adjacent thereto; means providing compression specimen supporting surfaces on said adjacent stationary member and on said intermediate cross member whereby the hydraulic support is subjected to compression during compression testing; means for supporting a tension specimen between said intermediate cross member and the other of said stationary cross members whereby the hydraulic support is also subjected to compression during tension testing; initial load springs operatively connected to said element and cross member between which the hydraulic support is interposed; and means for preventing lateral displacement of the hydraulic support.

2. The combination set forth in claim 1 further characterized in that said cylinder is directly connected to said hydraulic support, and the initial load springs are directly supported on said cylinder for initially loading said hydraulic support.

3. The combination set forth in claim 1 further characterized by the provision of a bracket secured to one of said stationary cross members and a stay plate connected to said bracket and the cylinder.

RICHARD W. DINZL.